United States Patent [19]

Sferrazza et al.

[11] Patent Number: 6,108,352
[45] Date of Patent: Aug. 22, 2000

[54] CIRCUIT AND METHOD FOR SYNCHRONIZING OUTPUTS OF TWO SIMULTANEOUSLY TRANSMITTING DEVICES IN A MULTIPLEXED COMMUNICATION SYSTEM

[75] Inventors: Paul K. Sferrazza, Somerville; Joseph W. Harmon, Brunswick, both of N.J.

[73] Assignee: Intersil Corporation, Palm Bay, Fla.

[21] Appl. No.: 08/854,681

[22] Filed: May 12, 1997

Related U.S. Application Data

[63] Continuation of application No. 08/396,616, Mar. 1, 1995, abandoned.

[51] Int. Cl.[7] ...................................................... H04J 3/06
[52] U.S. Cl. ............................................. 370/503; 375/360
[58] Field of Search .................................... 375/219, 340, 375/342, 360, 356; 370/445, 446, 447, 448, 458, 459, 460, 461, 229, 230, 231, 232, 233, 234, 235, 236, 239, 240, 503, 505, 504; 340/825.5

[56] References Cited

U.S. PATENT DOCUMENTS

| 4,234,952 | 11/1980 | Gable et al. | 370/448 |
|---|---|---|---|
| 4,353,128 | 10/1982 | Cummiskey | 370/505 |
| 4,710,918 | 12/1987 | Miyao | 370/448 |
| 4,751,701 | 6/1988 | Roos et al. | 370/445 |
| 4,860,006 | 8/1996 | Baran | 370/447 |
| 5,175,537 | 12/1992 | Jaffe et al. | 370/447 |
| 5,469,473 | 11/1995 | McClear et al. | 370/447 |
| 5,483,533 | 1/1996 | Kuba | 370/445 |

Primary Examiner—Huy D. Vu
Attorney, Agent, or Firm—Rogers & Killeen

[57] ABSTRACT

A circuit and method for synchronizing multiple transmitting devices in a multiplexed communication system in which transmitting nodes generate bit transitions on the multiplexed bus based on the time elapsed since the last received bit transition, and in which the synchronization is dependent only on the last received bit transition and on no other synchronization signal. The circuit and method may be used to prevent inadvertent bit transition transmission within a predetermined period of time of receipt of a bit transition.

16 Claims, 5 Drawing Sheets

CIRCUIT AND METHOD FOR SYNCHRONIZING OUTPUTS OF TWO SIMULTANEOUSLY TRANSMITTING DEVICES IN A MULTIPLEXED COMMUNICATION SYSTEM

This is a Continuation of application Ser. No. 08/396,616, filed Mar. 1, 1995, now abandoned.

The present application is related to U.S. patent application Ser. No. 08/395,591, by the inventors hereof that was filed on Feb. 28, 1995, entitled A MULTIPLE USE TIMER AND METHOD FOR PULSE WIDTH GENERATION, ECHO FAILURE DETECTION, AND RECEIVE PULSE WIDTH MEASUREMENT, and that is assigned to the assignee hereof.

BACKGROUND OF THE INVENTION

The present invention relates to methods and circuits for synchronizing multiple nodes transmitting on a bus in a multiplexed communication system, and more particularly to a method and circuit for managing the simultaneous, or near simultaneous, transmission and reception of a bit transition at a node by blocking transmission of bit transitions from the node for a predetermined period of time following reception of a bit transition.

With reference now to FIG. 1, a multiplexed communication system may include bus 10 for connecting plural nodes 12. The nodes 12 may include an interface circuit 14 for communicating on the bus 10, and a clocking element 16 for timing bit duration.

In multiple access communication systems two or more nodes 12 may be transmitting information on the bus 10 at the same, or nearly the same time. Typically, the information is in the form of data bits. The bus may have two states; high (or active) when a bit of a first type is being transmitted and low (or passive) when a bit of a second type is being transmitted. Each change of state takes place at a bit transition (from high to low, and low to high) that occurs coincident with a clock pulse at the transmitting node. A bit may be defined by its state and bit duration, where bit duration is determined by the number of clock pulses. A node transmitting a bit of a particular type will transmit a bit transition at the end of a bit (which becomes the beginning of the next bit), and will await a predetermined number of clock pulses before transmitting the next bit transition to define the end of that bit. For example, a bit of a particular type may be defined as having a high state and a duration of 64±32 clock pulses, where clock pulses may be one microsecond apart. Each node may have its own clock 16 for providing clock pulses that may not be synchronized with clocks in other nodes. As discussed in the above-identified related application, that is incorporated by reference, a counter/decoder may provide a timing count. The counter/decoder may be reset to zero upon occurrence of an event such as receipt or transmission of a bit transition so that a count from the counter/decoder may be used to time bit duration.

When the communication system employs a non-destructive arbitration method, bits of a particular state are assigned either a high (dominant) or low (recessive) priority. Conflicts that may occur when two nodes are transmitting bits of different states on the bus are resolved in favor of a bit state that has a higher priority. The node transmitting the bit with the lower priority must recognize the conflict and stop transmitting, leaving the bus to the node that won the priority contest.

As will be appreciated, there may be periods of time when two nodes are transmitting bits of the same type at the same, or nearly the same, time (see, for example, FIG. 2). Each node will continue to transmit until it loses the priority contest because it does not recognize that there is a conflict (i.e., it senses that the bus is carrying the correct bit state).

When two or more nodes are transmitting bits of the same type, it is desirable to maintain synchronization of the clock pulses at the transmitting nodes—recall that each node has its own source of clock pulses—so that the bit durations remain within a defined tolerance (i.e., the bit transitions occur at the same time, or nearly so). Without synchronization, variation in the time bases (clocking frequency) and delay paths of the nodes may cause a divergence in the transmitted bit transitions that may, if allowed to grow, cause the communication system to malfunction. In some prior art systems, a common synchronization clock is provided to each of the nodes to synchronize the bit transitions on the bus. Such a technique generally adds equipment which is not necessary in the present invention.

Accordingly, it is an object of the present invention to provide a novel method and circuit for synchronizing multiple transmitting nodes in a multiplexed communication system that obviate these and other problems of the prior art.

It is a further object of the present invention to provide a novel method and circuit for synchronizing transmitting nodes in a multiplexed communication system in which synchronization depends only on received bit transitions.

It is another object of the present invention to provide a novel method and circuit for synchronizing bit transitions from transmitting nodes in which a node detecting a bit transition on the bus will be prevented from transmitting a bit transition for a predetermined period of time.

It is yet another object of the present invention to provide a novel method and circuit for preventing inadvertent bit transition transmission by blocking transmission of bit transitions from a node detecting a bit transition until detection of a predetermined number of clock pulses.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
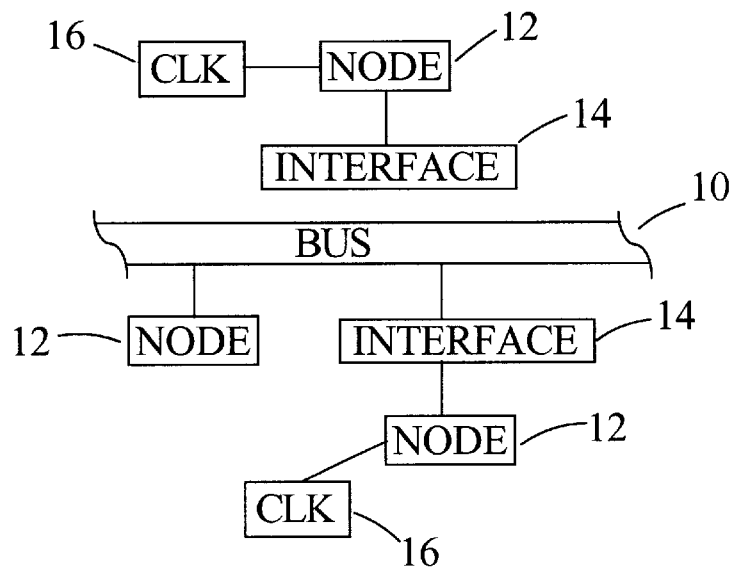
FIG. 1 is a block diagram of a multiplexed communication system of the prior art.
Figure 2:
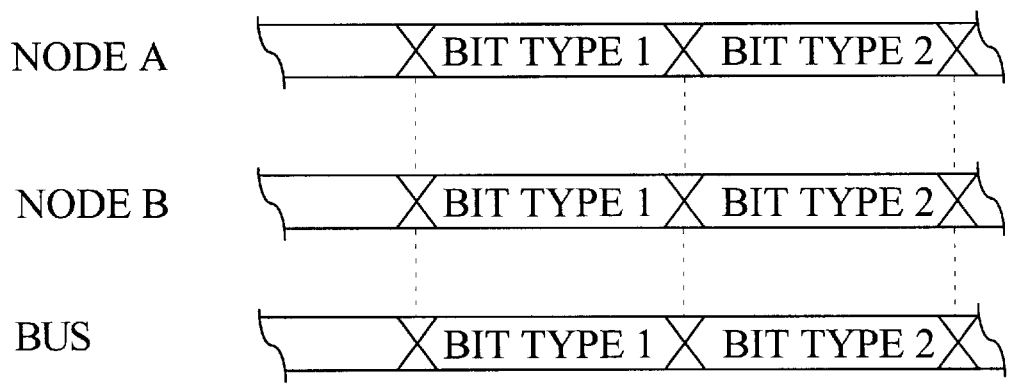
FIG. 2 is an illustration of bit streams from two nodes transmitting the same bit type at about the same time on a bus.
Figure 3:
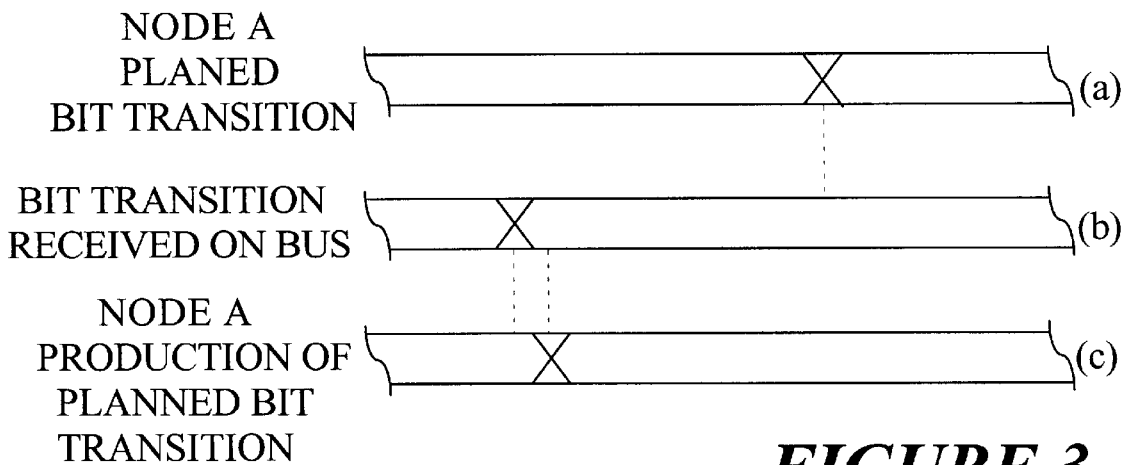
FIGS. 3 (a)–(c) illustrate a change of bit transition transmission time caused by receipt of a bit transition.

An embodiment of the present invention manages the simultaneous, or near simultaneous, transmission and reception of bit transitions at a node by blocking transmission of bit transitions from the node for a predetermined period of time following reception of a bit transition. By way of example, consider the situation when plural nodes are transmitting the same bit types at the same, or nearly the same, time. After a node has transmitted a bit transition on the bus and is waiting for the predetermined number of clock pulses before transmitting the next bit transition, the node may monitor the bus. In the event the next bit transition on the bus is a transition from a high priority to a low priority state, the bus transition will occur when all the transmitting nodes have transmitted the bit transition from high to low priority. In the event the bus is transitioning from a low to a high priority state, the bus will transition when the first bit transition appears on the bus. If the node senses that the bus has changed state to the higher priority before the predetermined number of clock pulses (e.g., before a predetermined count from a counter/decoder) but within the tolerance limits for the type of bit being transmitted, the node will immediately commence production of the next bit type (see, for example, FIG. 3), thereby synchronizing the bit transition on the earliest occurring bit transition. Note that if a change of state to a higher priority state is sensed outside the tolerance limits for the bit type, the transmitting node will have lost the arbitration conflict and will cease transmission.

Figure 4:
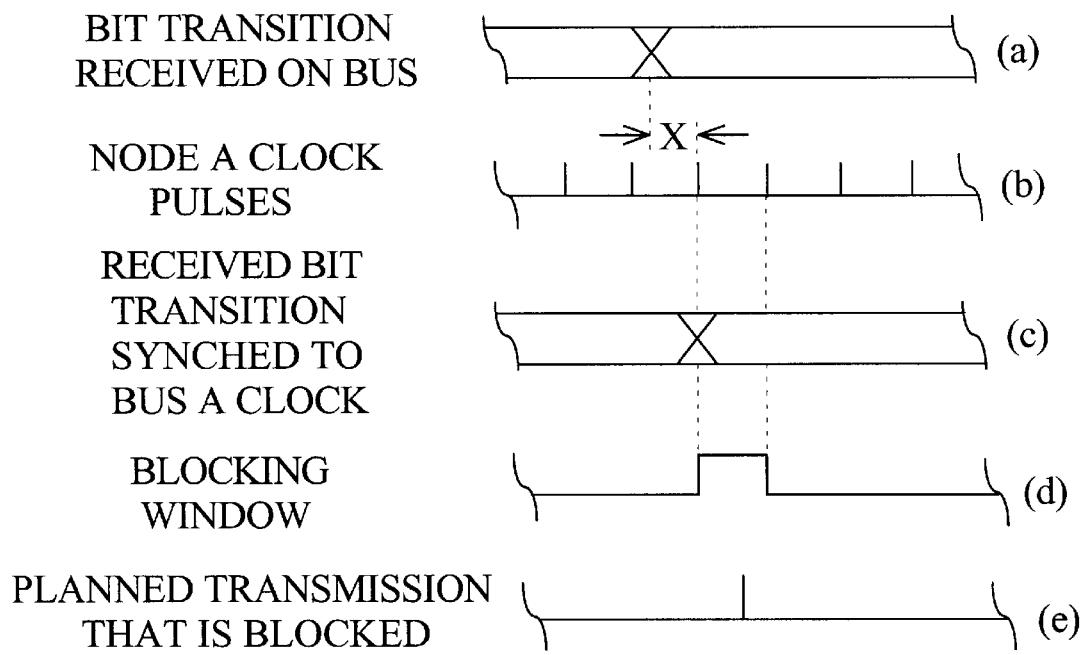
FIGS. 4 (a)–(e) illustrate an embodiment of the operation of the present invention.

With reference now to FIG. 4, an embodiment of the present invention may cause bit transitions received from the bus to be perceived as occurring over a period of time, and blocks bit transition transmissions during that period of time. Upon receipt from a bus of a bit transition at node A (FIG. 4 (a)), the node A bit transitions will be synchronized to the next node A clock pulse (FIGS. 4(b–c)) so that node A is synchronized to the earliest occurring bit transition. Bit transitions that were planned to have been transmitted during a predetermined time period after receipt of the bit transition are prevented from being transmitted during the predetermined time period (FIGS. 4(d–e)). While the predetermined time period for blocking may vary in length (e.g., a fraction of a cycle to multiple cycles), it is desirably one sync-clock cycle in length (such as shown by arrow A in FIG. 7).

Figure 5:
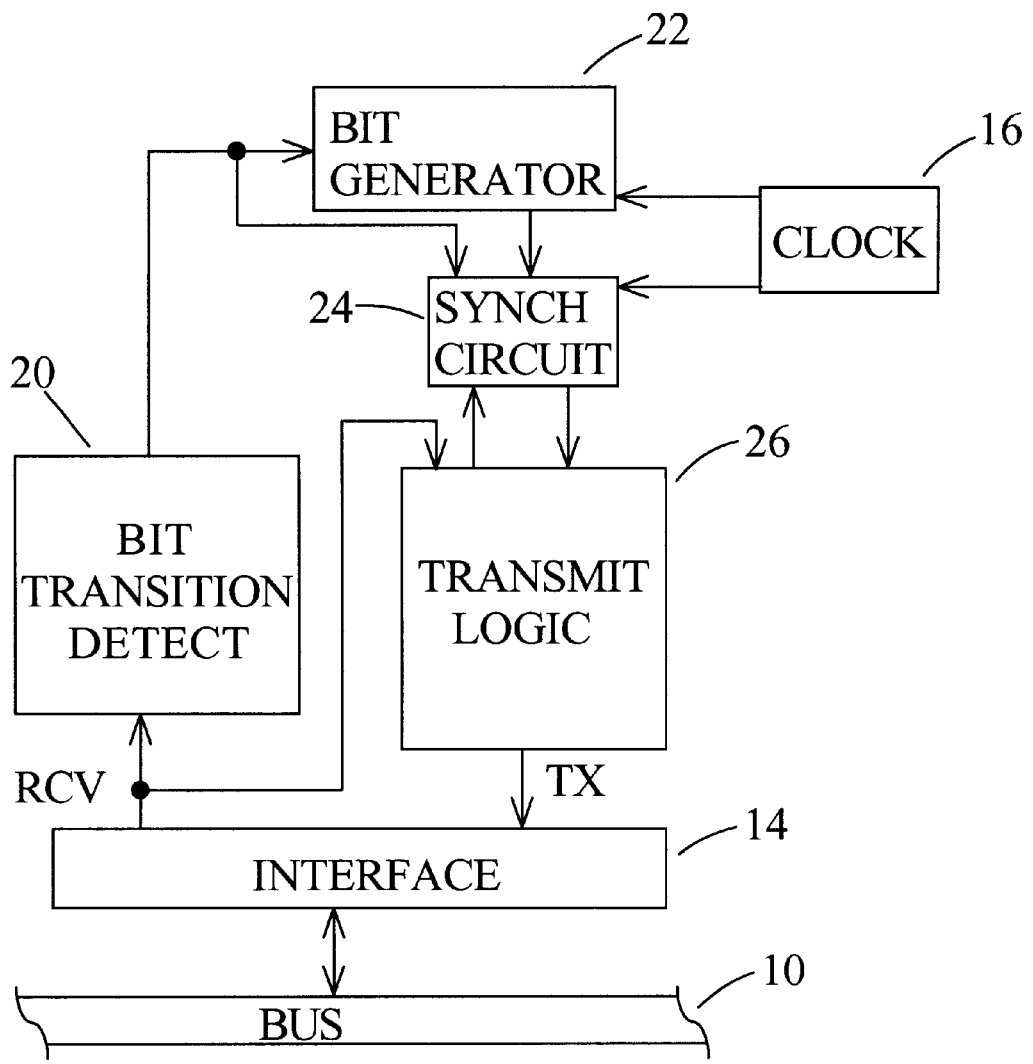
FIG. 5 is a block diagram of an embodiment of the node transmit circuit of the present invention.

With reference now to FIG. 5 an embodiment of a node 12 transmit circuit of the present invention may include a bit transition detector 20 for detecting bit transitions on the bus 10, and a bit generator 22 for providing bit type instructions (state and duration) to a synchronization circuit 24 for synchronization to the node's internal clock 16. The bit transition may be provided to the transmit logic circuit 26 for transmission on the bus.

Figure 6:
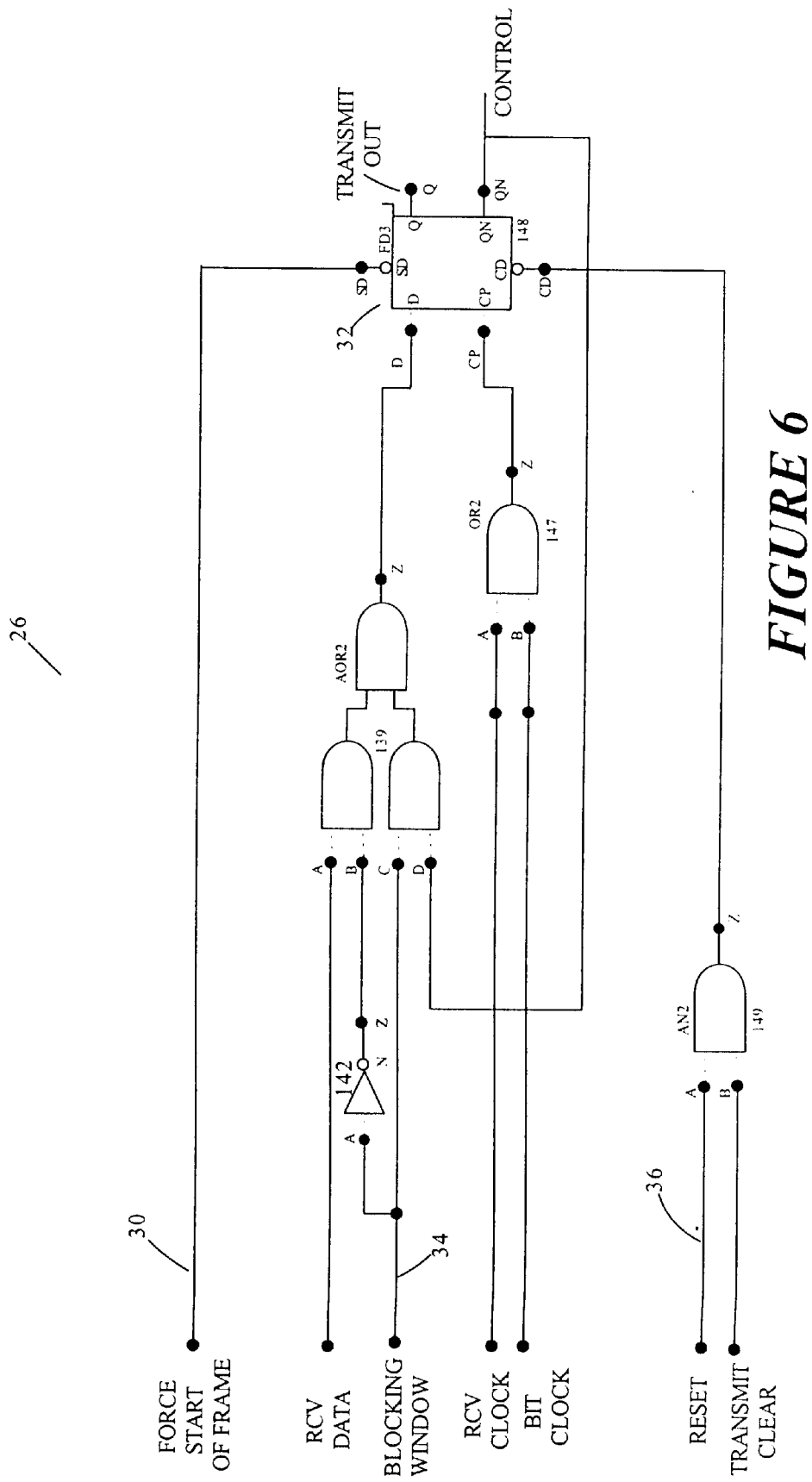
FIG. 6 is a circuit diagram of an embodiment of the transmit logic of FIG. 5.
Figure 7:
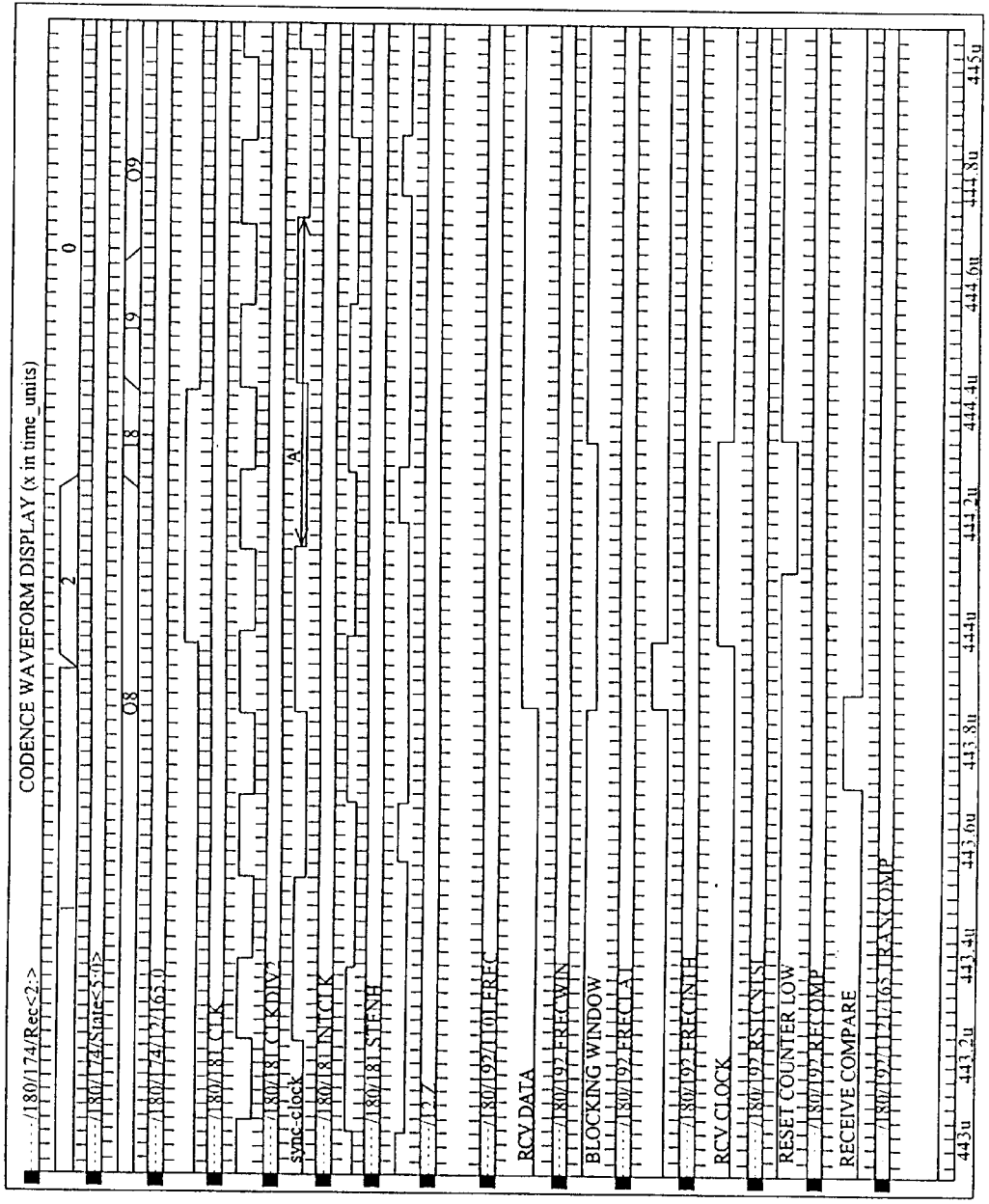
FIG. 7 is a timing diagram illustrating operation of an embodiment of the present invention.

The transmit logic 26 of FIG. 5 may be more clearly understood with reference to FIGS. 6 and 7 that depict a circuit and timing diagram, as will be appreciated by those of skill in the art. As explained below, a latch 32 (e.g., a flip-flop) is desirably always synched to the bus. A FORCE START OF FRAME signal 30 indicates to latch 32 that a low-to-high bit transition is to be produced on the bus to initiate a frame of bits. Under one protocol with which the present invention finds application, signal 30 may only be sent when the bus has been low (passive) for at least a predetermined period of time, such as 275 microseconds. The BLOCKING WINDOW signal 34 prevents transmission of a bit transition during the period of the window by the bit clock. The circuit may be initialized with RESET signal 36. A TRANSMIT CLEAR signal may be used to force the bus low when a fault at the transmitting node causes the node to erroneously maintain bus control, as when a "no echo" indication has been received that is discussed in the related application.

As depicted in FIGS. 6 and 7, when a received data transition is detected on the bus (note the pulse on the RECEIVE COMPARE lead), the transmit logic does not recognize the pulse until the next cycle of the synchronization clock (SYNC-CLOCK). At that time, the received data signal (RCV DATA) is updated to reflect the status of the bus and the blocking window signal is flipped for a full cycle of the synchronization clock (BLOCKING WINDOW low in FIG. 7). Shortly after the RCV DATA line is updated, a receive clock signal (RCV CLOCK) signal is sent to the OR gate OR2, and ultimately to the clock pulse input of the D-Q flip-flop (FD3). The operation of the pulse of the RCV CLOCK causes the received data to be clocked into the D-Q flip-flop so that the flip-flop contains the current state of the bus.

While the BLOCKING WINDOW is not low, the D input of the D-Q flip-flop is controlled by the inverse output signal from the flip-flop (QN). Thus, the D-Q flip-flop is ready to send the next transition to the bus upon receipt of a clocking signal through the OR gate OR2. When the signal on the bus is to be transitioned, the BIT CLOCK lead may be pulsed, causing the D-Q flip-flop to be clocked and the new state of the bus to be output.

Note that while the BLOCKING WINDOW signal is low, the signal from QN is blocked by the AND gate 139. Thus, during blocking, any signals on the RCV CLOCK or the BIT CLOCK will merely cause the same state as was recently received to be clocked through the D-Q flip-flop, avoiding an unwanted change of the state of the bus within the period of the blocking window. Thus, the latch 32 may be always synched to the bus. While the blocking window is depicted to be one cycle of the synchronization clock, there is no reason for the length of the blocking to be so limited and any suitable logic circuit may be used to time a blocking signal of any desired length.

A RESET COUNTER LOW signal (FIG. 7) may be provided to reset the counter/decoder to zero so that the next bit duration may be timed, thereby synchronizing the bit transition to the earliest arriving low-to-high bit transition (and the last arriving high-to-low transition). The duration of the BLOCKING WINDOW signal may be selected to cover the time period needed for the counter/decoder to be reset. Until the counter/decoder has been reset to zero it could provide an erroneous count (causing an unwanted bit transition to be transmitted) that could cause system malfunction. This typically takes less than a clock cycle and thus more than a one clock cycle blocking period may not be needed. Once the counter has been reset to zero, an erroneous signal cannot be provided.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of synchronizing the data signal bit transitions from a plurality of nodes capable of simultaneously transmitting data in a multiplexed communication system, said method comprising the steps of receiving data signal bit transitions from a first node in the system, and transmitting further data signal bit transitions from a second node in the system in synchronization therewith, and in addition to, the data signal bit transitions from the first node based on a timing of the received data signal bit transitions.

2. The method of claim 1 further comprising the step of preventing a node that has detected a bit transition from transmitting a bit transition for a predetermined period of time.

3. The method of claim 1 further comprising the step of providing a node with a latch that is synchronized with a state of a bus on which the bit transitions are transmitted, the latch not changing state for a predetermined period of time after detection of a bit transition on the bus.

4. A method for preventing transmission of a bit transition in a multiplexed communication system having a plurality of nodes capable of simultaneously transmitting data, the data from the plurality of nodes having data signal bit transitions occurring on a bus at the same or approximately the same time, the method comprising the steps of:

(a) providing periodic sync-clock cycles that are detected by the plurality of nodes; and (b) upon detection by one of the plurality of nodes of a data signal bit transition on the bus, blocking the one node's ability to transmit a further data signal bit transition until detection of a predetermined number of sync-clock cycles.

5. The method of claim 4 wherein the predetermined number of sync-clock cycles is one.

6. The method of claim 4 wherein a period between consecutive bit transitions transmitted from one of the nodes is substantially longer than a cycle of the sync-clock.

7. A circuit for preventing transmission of a bit transition in a multiplexed communication system having plural nodes capable of simultaneously transmitting data on a bus, the circuit comprising:

means for providing periodic sync-clock cycles for detection by the nodes; and means for blocking the nodes' ability to transmit a data signal bit transition until detection of a predetermined number of sync-clock cycles after detection of a data signal bit transition on the bus.

8. The circuit of claim 7 wherein the predetermined number of sync-clock cycles is one.

9. A circuit for preventing bit transition transmission in a multiplexed communication system in which multiple nodes are capable of simultaneously transmitting data on a bus with the data signal bit transitions from the individual nodes occurring at the same or approximately the same time, the circuit comprising a clock for indicating clock cycles and a latch for preventing a node that has detected a data signal bit transition on the bus from transmitting a data signal bit transition for a predetermined number of clock cycles.

10. In a multiplexed communication system capable of simultaneous node transmission, a method for synchronizing transmitting nodes comprising the steps of:

(a) transmitting data bits from a plurality of nodes onto a common bus such that the data bit transitions from the plurality of nodes occur at the same or at approximately the same time;

(b) altering a state of the bus based on the data bit transitions transmitted from the plurality of nodes;

(c) detecting at the plurality of nodes the altered state of the bus; and, (d) continuing to transmit data bits from the plurality of nodes based on the detected altered state of the bus.

11. The method of claim 10 wherein the step of continuing to transmit comprises the step of transmitting bit transitions in synchronization based on the timing of the received bit transitions of the bus.

12. The method of claim 10 wherein the step of continuing to transmit comprises the step of preventing a node that has detected a bit transition of the bus from transmitting a bit transition for a predetermined period of time.

13. The method of claim 11 wherein the step of transmitting comprises providing a node with a latch that is synchronized with the state of the bus, the latch not changing state for a predetermined period of time after detection of a bit transition of the bus.

14. The method of claim 10 further comprising the step of assigning priority levels to data bit types.

15. The method of claim 14 wherein the step of altering comprises the steps of:

(a) transitioning from a state of the bus associated with a high priority data bit to a state associated with a low priority data only if all of the plurality of nodes which are transmitting data bits transmit a bit transition from a high to a low priority; and, (b) transitioning from a state associated with a low priority data bit to a-state associated with a high priority data bit if any of the plurality of nodes transmits a bit transition from a low priority data bit type to a high priority data bit type.

16. In a multiplexed communication system having plural nodes which transmit data on a common bus, a method of synchronizing the transmission of data from the plural nodes by controlling the transmission of data by each node as a function of the state of the bus as determined by the bit transitions transmitted from the other nodes.

* * * * *